(12) United States Patent
Platonov

(10) Patent No.: US 10,523,024 B2
(45) Date of Patent: Dec. 31, 2019

(54) METHOD AND DEVICE FOR BATTERY CHARGING AND MAINTENANCE

(71) Applicant: Gennady Platonov, Moscow (RU)

(72) Inventor: Gennady Platonov, Moscow (RU)

(*) Notice: Subject to any disclaimer, the term of this patent is extended or adjusted under 35 U.S.C. 154(b) by 377 days.

(21) Appl. No.: 15/473,789

(22) Filed: Mar. 30, 2017

(65) Prior Publication Data

US 2018/0287402 A1    Oct. 4, 2018

(51) Int. Cl.
*H02J 7/00* (2006.01)
*H02M 7/155* (2006.01)
*H02M 7/515* (2007.01)

(52) U.S. Cl.
CPC ............ *H02J 7/0052* (2013.01); *H02M 7/155* (2013.01); *H02M 7/515* (2013.01)

(58) Field of Classification Search
CPC ...................................................... H02J 7/0052
USPC ................................................................ 320/107
See application file for complete search history.

(56) References Cited

U.S. PATENT DOCUMENTS

| 4,253,054 | A | * | 2/1981 | Steigerwald | .......... | H02J 7/0093 |
|||||||320/129|
| 4,829,225 | A | * | 5/1989 | Podrazhansky | ....... | H01M 10/44 |
|||||||320/129|
| 5,998,968 | A | | 12/1999 | Pittman et al. | | |
| 6,215,271 | B1 | * | 4/2001 | Lerow | ................... | H02J 7/1492 |
|||||||320/104|
| 9,461,492 | B1 | | 10/2016 | Berkowitz et al. | | |
| 2009/0029192 | A1 | | 1/2009 | Andersson | | |

FOREIGN PATENT DOCUMENTS

EP         0623252 A1    11/1994

* cited by examiner

*Primary Examiner* — Jerry D Robbins
(74) *Attorney, Agent, or Firm* — Nadya Reingand; Yan Hankin

(57) ABSTRACT

A method and device is disclosed for charging and/or maintenance of lead-acid and alkaline accumulator batteries, allowing a charge, discharge, or recovery in control-conditioning cycles of these batteries. To increase efficiency of the battery recovery process, its charge is created by a reversible current in consecutive stages. Correction of the charging mode is provided based on voltage and temperature of the accumulator battery.

20 Claims, 6 Drawing Sheets

METHOD AND DEVICE FOR BATTERY CHARGING AND MAINTENANCE

FIELD OF THE INVENTION

This invention relates to electro-technological methods and devices for the maintenance of batteries, allowing to carry out the state control, regenerative charging, and cyclical recovery state of the battery.

BACKGROUND OF THE INVENTION

United States Patent Publication No. US 2004/0032247, by Dykeman, discloses a battery charging system that provides cyclic charging pulses to a battery, wherein the charging pulse has a current component and a voltage component that varies between a quiescent voltage and a maximum voltage. The system further comprises a battery monitoring circuit adapted to monitor one or more of the battery's parameters that respond to the charging pulses, and a control module that adjusts the configuration of the current component of the charging pulses to maintain the voltage component in a range between the quiescent voltage and the maximum voltage in response to the monitored battery parameter. Charging and discharging pulses are alternated during the charging cycle. The published patent application further discloses a temperature sensing charger in which the charge discharge cycle is further regulated based upon the detected temperature of the battery. The main disadvantage of this system is that it does not have a high recovery efficiency for different battery states restored in the battery during an initial period of operation.

U.S. Pat. No. 7,557,541, to Marinka-Tóth et al., discloses a charging method by which the molecular movements in the cells of the rechargeable battery can be accelerated. Through this process, the time necessary for the chemical transformations and the time necessary for the full charge itself can be reduced. In that patent, there are different charging intervals inserted into the charging current, namely interval "a," which is a pulsed charging interval, followed by an interval "e," which is a charging interval with a continuous charging current. That patent discloses using a short discharge interval prior to charging to increase a battery's charge take-up capacity. That patent also monitors the internal resonance of the battery.

U.S. Pat. No. 6,856,118, to Lindqvist et al., discloses a battery charging system using hardware, software, and microcomputers to control the charging of the battery. Per that disclosure, temperature and conductivity measurements are additionally taken to control the battery charging. That patent regards a regeneration process for a battery, first to regenerate the chemical storage capacity, then to discharge the battery, and finally to recharge the battery. That patent also discloses a network and data storage system for the batteries to track their maintenance over time.

U.S. Pat. No. 6,504,344, to Adams et al., discloses a system for determining the health of a battery with multiple modules by measuring the health of each module, performing a discharge of each module, and then recharging each module, progressing from one module to the next. That disclosure takes into account the temperature of the battery or battery modules when performing the health measurement, as well as the charge and discharge cycles. That disclosure may offer the possibility of individual equalization of the individual cells in the battery, but that possibility requires a connection to the current lead battery as an additional charge source. Modern batteries do not always have access to current lead so the use of the method as disclosed by Adams et al. is limited to specific battery types.

In general, thyristors are unidirectional half-controlled electric wrenches. Thyristors can be forced open, and they close automatically if the current in its power circuit becomes less than the current retention. The main advantage of thyristors is their high overload capacity: 10-30 fold excess of the limit (shock) on current workers. The consequence of this is the high reliability of the devices formed on thyristors. The main drawback of a thyristor, however, is the complexity of the forced locking.

To improve the reliability of the operation of thyristor devices, developers prefer to provide a natural lock thyristor (transitions through zero voltage in the power supply). Torque control switching thyristor systems provide pulse-phase control, which controls the switching pulse delay with respect to the thyristor at a zero crossing in the mainstream voltage. This control principle is widely used in thyristor controlled rectifiers and inverters, i.e., the slave network. The latter term implies that the inverter thyristors provide natural commutation, i.e., they are locked under the influence of the mainstream voltage.

However, even when the battery charge is necessary to form a reverse current, i.e., to provide a consistently performing thyristor rectifier and inverter driven network, the design still cannot allow the simultaneous operation of a thyristor rectifier and inverter, as this will lead to a short circuit in the network via the thyristors. Thus, such operation is possible only after the closing of one or the other thyristor. The minimum pulse repetition period of the reverse current is 70-80 ms (depending on the frequency of the current in the network), which is higher than the desired value in methods for battery charging and maintenance. The present invention address this problem of the minimum pulse repetition period.

SUMMARY OF THE INVENTION

The claimed invention provides a battery in the process to introduce an additional stage of alignment for batteries and where the reverse current equals the average values of the charging and discharging current. In this case, the conditions are created for the opening of pores in the salt deposits on the electrodes of the battery and there is no battery power; that is, the alignment is performed between the individual characteristics of the cells in the battery. The alignment process will be accompanied by a decrease in the internal resistance of the battery, and the completion of the alignment process can be seen in the stabilization of this resistance for 0.5 to 1.0 hour.

In some aspects, the present invention comprises a device for battery charging and maintenance, comprising a terminal for an accumulator battery; the terminal having a positive side connected to a current sensor; the terminal having a negative side connected to a ground; the current sensor is electronically connected to a rectifier, said rectifier comprising at least three rectifier thyristors, and an inverter, said inverter comprising at least three inverter thyristors; the rectifier and the inverter are connected to a transformer; the transformer is connected to a power supply; and the terminal, the accumulator battery, the inverter, the rectifier, and the current sensor are together electronically connected to a phase-pulse control system, thus forming a power supply network, said phase-pulse control system being configured to cause the power supply network to perform at least one stage, said stage comprising: (1) forming a first pulse, said first pulse being formed by the rectifier, said first pulse being synchronized via a front transition of a sinusoidal inter-phase voltage signal, wherein a first timer-counter controlling a first set of rectifier thyristors is synchronized by a first inter-phase voltage, wherein a second timer-counter controlling a second set of rectifier thyristors is synchronized by a second inter-phase voltage, wherein a third timer-counter controlling a third set of rectifier thyristors is synchronized by a third inter-phase voltage, (2) measuring a total period (T) in the power supply network, said measuring being performed by one of said timer-counters, (3) causing a pause, said pause being caused by an end of an interval prior to a consecutive front transition, said pause further causing a closure of all rectifier thyristors, (4) forming a second pulse, said second pulse being formed by the inverter, said second pulse being synchronized at moments of inter-phase voltage peaks in the power supply network, said inter-phase voltage peaks being determined by adding an interval of T/4 to a given moment of a front transition of an inter-phase voltage, wherein a fourth timer-counter controlling a first set of inverter thyristors is synchronized by the first inter-phase voltage, wherein a fifth timer-counter controlling a second set of inverter thyristors is synchronized by the second inter-phase voltage, wherein a sixth timer-counter controlling a third set of inverter thyristors is synchronized by the third inter-phase voltage; and (5) repeating said first pulse, said pause, and said second pulse.

In some aspects, the pause is 25-30 ms. In some aspects, the pause is 30-70 ms. In some aspects, T is measured at least twice by said timer-counter and an average value of T is determined via a processor coupled to said timer-counter. In some aspects, the phase-pulse control system is in further electronic communication with a programmable logic controller. In some aspects, the programmable logic controller is further electronically connected to a human machine interface and to a thermal monitor. In some aspects, the thermal monitor is further connected to a thermal sensor, said thermal sensor being in contact with the accumulator battery.

Also disclosed is a method for battery maintenance, comprising connecting a battery to a power supply network, performing at least one stage of charging, said at least one stage of charging comprising: (1) forming a first pulse, said first pulse being formed by a rectifier, said rectifier comprising at least three rectifier thyristors, said first pulse being synchronized via a front transition of a sinusoidal inter-phase voltage signal, wherein a first timer-counter controlling a first set of rectifier thyristors is synchronized by a first inter-phase voltage, wherein a second timer-counter controlling a second set of rectifier thyristors is synchronized by a second inter-phase voltage, wherein a third timer-counter controlling a third set of rectifier thyristors is synchronized by a third inter-phase voltage, (2) measuring a total period (T) in the power supply network, said measuring being performed by one of said timer-counters, (3) forming a second pulse, said second pulse being formed by an inverter, said inverter comprising at least three inverter thyristors, said second pulse being synchronized at moments of inter-phase voltage peaks in the power supply network, said inter-phase voltage peaks being determined by adding an interval of T/4 to a given moment of a front transition of an inter-phase voltage, wherein a fourth timer-counter controlling a first set of inverter thyristors is synchronized by the first inter-phase voltage, wherein a fifth timer-counter controlling a second set of inverter thyristors is synchronized by the second inter-phase voltage, wherein a sixth timer-counter controlling a third set of inverter thyristors is synchronized by the third inter-phase voltage; (4) wherein a pause occurs between said first pulse and said second pulse, said pause being caused by an end of an interval prior to a consecutive front transition, said pause further causing a closure of all rectifier thyristors, (5) thus forming a first pulse-pause-second pulse signal for one or more stages of battery maintenance, and (6) repeating said first pulse, said pause, and said second pulse.

In some aspects, the method comprises using only a pre-charge reverse current in a first stage. In some aspects, the method further comprises a second stage of maintenance, said second stage employing a leveling reverse current for stabilizing an internal resistance of the battery. In some aspects, the method further comprises a third stage of maintenance, said third stage employing pulses of reverse current and following said pulses of reverse current with a dead time. In some aspects, the method further comprises a fourth stage of maintenance, said fourth stage charging the battery using a reverse current. In some aspects, the third stage and the fourth stage are repeated at least once. In some aspects, the second stage lasts 0.5 to 1 hour.

In some aspects, a reverse current period is between 30-1000 ms in duration. In some aspects, during stage 2 the average values of reverse current and forward current are equal. In some aspects, a reverse current period is between 30-1000 ms in duration. In some aspects, during stage 3 a duration of the powerful pulses of reverse current is between 180-1000 ms and a duration of the dead time is between 1000-5000 ms. In some aspects, during stage 3 a ratio between reverse current and either forward current or dead time is between 10:1-20:1. In some aspects, the method further comprises implementing a temperature control of an electrolyte in the battery, comprising: monitoring the battery and determining if a battery temperature exceeds values of 35-50° C. during maintenance then reducing charge current by 30-50% and extending a charging stage for the battery accordingly; and monitoring the battery and determining if a battery temperature exceeds values of 45-50° C. during maintenance then interrupting maintenance until the battery has cooled to a temperature of 25-35° C.

BRIEF DESCRIPTION OF THE DRAWINGS

The present invention will now be discussed in further detail below with reference to the accompanying figures, in which.

DETAILED DESCRIPTION OF THE PREFERRED EMBODIMENTS

Figure 1:
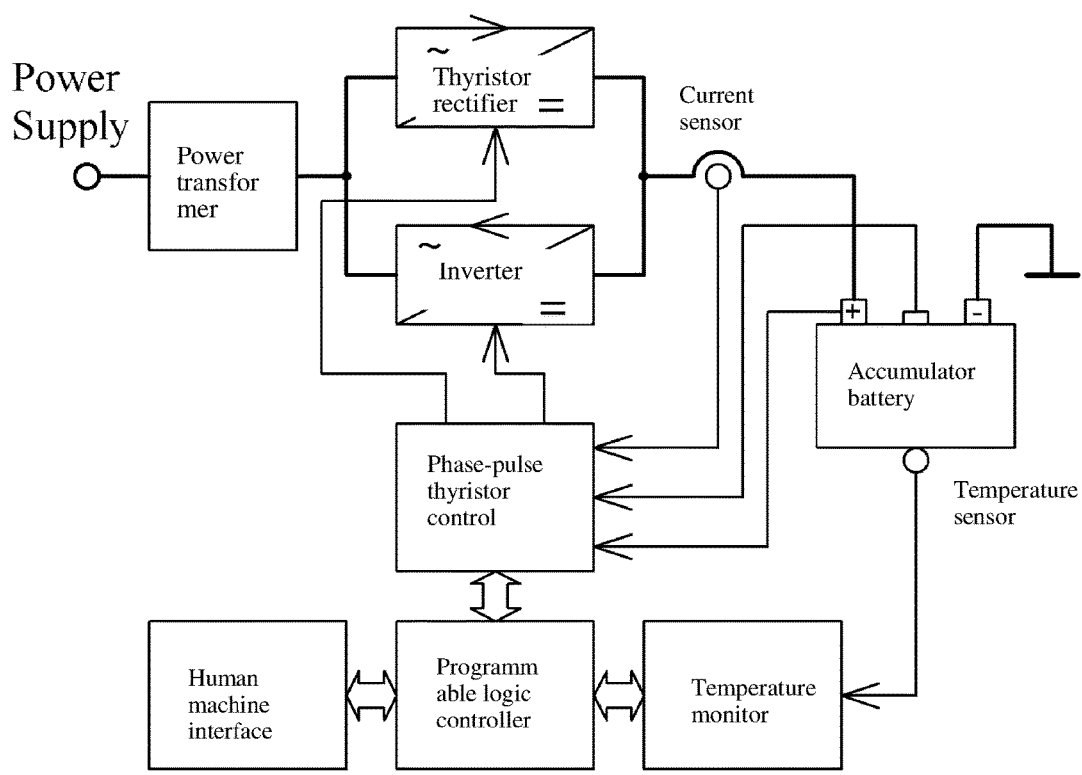
FIG. 1 shows a functional diagram of the device for accumulator and/or battery maintenance as described herein.

In general, and based on the state of the art, the leading cause of deterioration of lead-acid battery parameters is the partial irreversible negative electrode sulfation, coupled with the partial irreversible hydration of the alkali. These processes are related to the overgrowth of salt deposits formed on the electrodes when the battery discharges. If used in an alternating charge (i.e. reverse) current, then the recovery process in the salt precipitate is intensified and there is a more complete electro-dissolution salt sediment and an increase in associated battery electrode area recovery. At the same time with the opening of pores in the battery with a partial capacity for work will be charged and fully functioning batteries that will not lead to the equalization of the characteristics between the individual batteries.

The present invention describes a charge-discharge means used for maintenance of lead-acid and alkaline accumulator batteries. One of the novelties of the invention is the charge-discharge means used for maintenance of lead-acid and alkaline batteries and rechargeable batteries. The term "charge-discharge means," as used herein, is defined as including but not limited to the creation of forward and reverse currents in a circuit, via the closing and opening of rectifier thyristors and inverter thyristors according to a periodic signal, which in turn causes a flow of either a positive (forward) current or a negative (reverse) current, the thyristor(s) being connected in the circuit with a battery to be charged and/or maintained.

The term "reverse(d) current," as used herein, is defined as a current applied to the positive terminal of the battery to recharge the battery.

The present invention also describes a technological method for battery maintenance that allows for the monitoring of battery condition, alignment characteristics of the cells in the battery, charge or recovery of the battery, and a device for implementing the method.

Rechargeable battery maintenance is accomplished by alternating modes of full discharge control regimes and subsequent full charge. To equalize the electrolyte concentration gradient in the cells of the battery undergoing maintenance between the previous charge cycle and the next discharge cycle, there is generally a dead time of 10 minutes-180 minutes.

Control discharge of the battery is performed using a stable and constant-direction stream, $I_P$ (see Table 1), to its full discharge voltage, $U_P$ (see Table 1). During the discharge process, the output capacity of the battery is measured to give average battery charge.

The method of charging the battery generally consists of 4 stages: pre-charge reversing current (1st stage), $I_{Z1}$ (see Table 1), leveling reverse current (2nd stage), charging using powerful pulses of reversed current followed by dead time (3rd stage), and charging using reversed current (4th stage), $I_{Z4}$ (see Table 1). If necessary, stages 3 and 4 are repeated several times. Completion of stage 1, stage 3, and stage 4 is carried out based on the charge time. Completion of stage 2 is carried out to stabilize the internal resistance of the battery, taking approximately 0.5 to 1 hours. At stages 1 and 4, the reversed current period comprises about 30 milliseconds (ms) to 1,000 ms, and the ratio of the reversed current's average values is between 5:1 and 20:1.

During stage 2, the reverse current equals the average values of the forward and reverse components, each of which is calculated as the value, $I_{Z1}/I_{Z2}$. The reverse current period is the same as in stage 1.

In stage 3, the charge duration of the reverse current pulse is about 180 ms to 1,000 ms, followed by a dead time of 1,000 ms to 5,000 ms. The amplitudes of forward and reverse components are equal to $I_M$ (see Table 1), and the ratio of their mean values is between 10:1 and 20:1.

The battery maintenance process is completed after a full charge if: (1) there is no increase compared to previous cycle in the control discharge capacity of the battery, or (2) if the last control discharge output was 95-100% of the nominal capacity of the rated capacity of the battery being serviced.

During the process of battery maintenance, temperature control of the electrolyte in the battery is implemented. If the battery temperature exceeds values of 35-40° C. while charging, a single reduction in charging current of 30-50% is implemented and the charging stage is extended accordingly and proportionately. If the temperature range of the battery exceeds 45-50° C., then the process is interrupted until the battery has cooled to a temperature of 25-35° C.

In the charge and discharge processes, the voltage across the battery and the control group of battery cells is controlled. If their maximum permitted voltage values, UM, are exceeded (see Table 1), then battery charging is terminated. If, during the charge stage, the set voltage value, $U_C$ (see Table 1), is exceeded, then charge current is decreased 20-50% and stage phase duration is lengthened accordingly and proportionately.

TABLE 1

The values of technological parameters for serviceable types of accumulator batteries (where $C_N$ = nominal capacity of the battery, in Ampere-hours; and n = quantity of accumulators in the battery):

| No P/P | Parameter | Unit | Lead Acid Type | Alkaline Type |
|---|---|---|---|---|
| 1 | Discharge current, $I_P$ | A | $(0.025\text{-}0.2) \cdot C_N$ | $(0.1\text{-}0.2) \cdot C_N$ |
| 2 | The voltage of full charge, $U_P$ | B | $(1.75\text{-}1.8) \cdot n$ | $(1\text{-}1.1) \cdot n$ |
| 3 | The current first phase of $I_{Z1}$ charge | A | $(0.025\text{-}0.1) \cdot C_N$ | $(0.05\text{-}0.25) \cdot C_N$ |
| 4 | The amplitude of the current pulses of the third stage $I_M$ charge | A | $(0.2\text{-}2) \cdot C_N$ | $(0.25\text{-}4) \cdot C_N$ |
| 5 | Fourth stage charge current, $I_{Z3}$ | A | $(0.05\text{-}0.2) \cdot C_N$ | $(0.1\text{-}0.25) \cdot C_N$ |
| 6 | Charge current compensation voltage, $U_K$ | B | $(2.4\text{-}2.65) \cdot n$ | $(1.75\text{-}1.85) \cdot n$ |
| 7 | Termination voltage $U_M$ charge process | B | $(2.65\text{-}2.8) \cdot n$ | $(1.85\text{-}1.9) \cdot n$ |

The device, implemented according to the claimed method of battery maintenance, and performing the same steps as the claimed method of battery maintenance, comprises a power transformer (T) of the thyristor rectifier (R), the slave network thyristor inverter (I), an output current sensor (CS), a temperature sensor (TS), a system of phase-pulse thyristor control (PPCS), a programmable logic controller (PLC), an operator human machine interface (HMI) panel, and a battery temperature monitor (TM).

The output current sensor is connected to the battery being serviced (AB), in which the individual control of temperature sensors (TS) are placed on the batteries. Power is provided to the device from the main AC power.

Formation of the battery discharge current is carried out in the slave network thyristor inverter and the reverse current—due to alternate work thyristor rectifier and inverter driven network. These thyristors are controlled using the PPCS. The PPCS also provides digitization of signals from the output current sensor (CS) and the voltage across the battery, and the PPCS controls the battery. The digitized data is transmitted to the PLC. The PPCS performs the function of stabilizing the device's output current.

The algorithm of the proposed method of battery maintenance for batteries in storage is implemented by the PLC. The PLC controls the thyristor phase-pulse control system.

The TM collects data from thermal sensors in the accumulators of the battery undergoing maintenance and sends that data to the PLC.

The battery maintenance process operator controls the device using the HMI and is connected to the PLC.

FIG. 1 shows a functional diagram of the device according to the present invention. The core components and device blocks are labelled on the diagram: T—Transformer; R—Rectifier; I—Inverter; CS—Current Sensor; AB—Accumulator Battery; PPCS—Phase-Pulse Control System; HMI—Human Machine Interface; PLC—Programmable Logic Controller; TM—Thermal Monitor; TS—Temperature Sensor.

Figure 2:
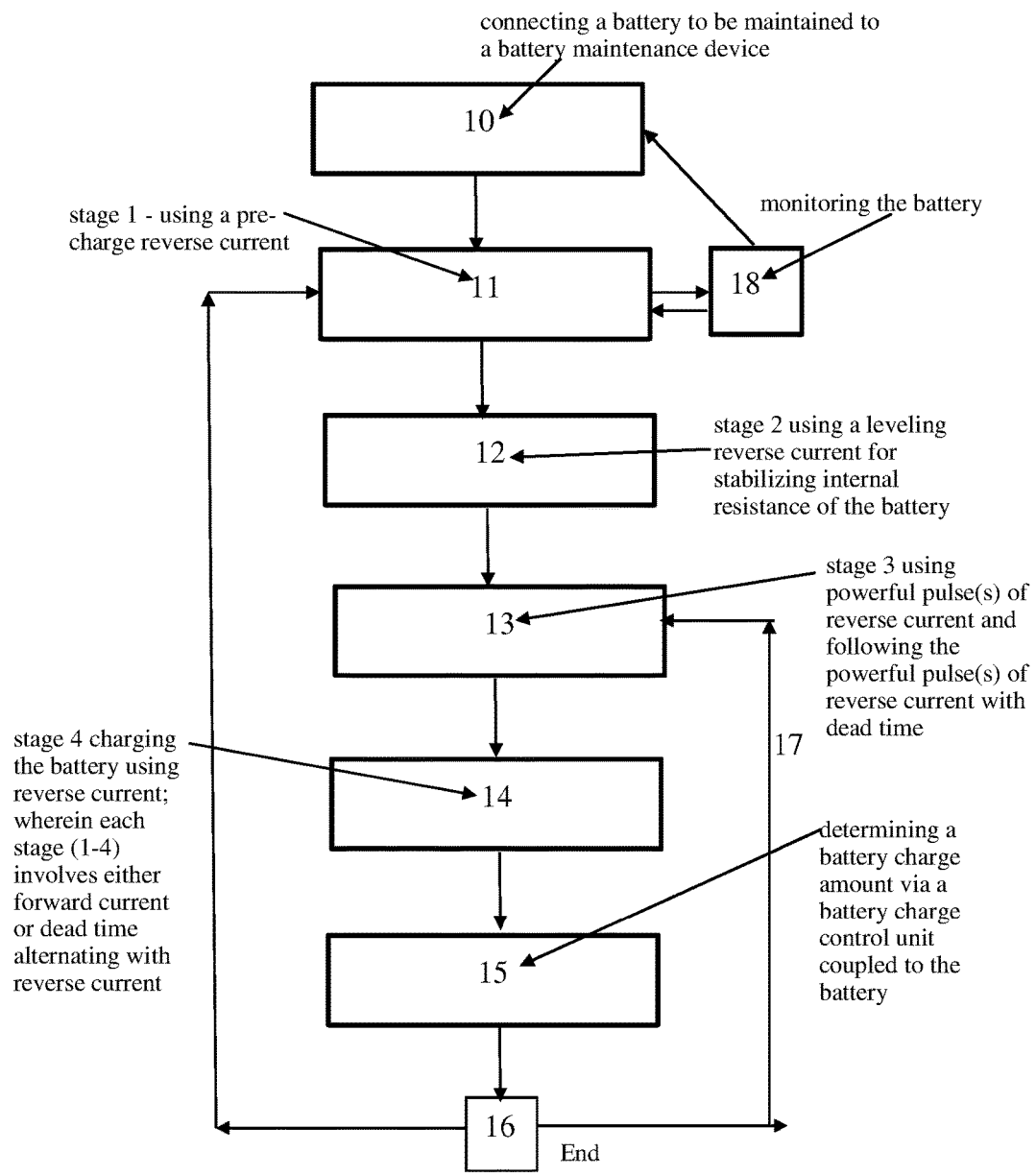
FIG. 2 shows the steps of the method for battery maintenance as described herein.

FIG. 2 shows the steps of the method for battery maintenance according to the present invention: 10—connecting a battery to be maintained to a battery maintenance device; 11-stage 1—using a pre-charge reverse current; 12—stage 2 using a leveling reverse current for stabilizing internal resistance of the battery; 13—stage 3 using powerful pulse(s) of reverse current and following the powerful pulse(s) of reverse current with dead time; 14—stage 4 charging the battery using reverse current; wherein each stage (1-4) involves either forward current or dead time alternating with reverse current; 15—determining a battery charge amount via a battery charge control unit coupled to the battery.

If the battery charge control unit 15 indicates full charge, the process is determined as complete 16. Alternatively, 17, stages 3 and 4 may be repeated several times until the battery charge control unit 15 indicates that the battery is fully recharged.

Stage 2 is preferably occurring for 0.5 hour to 1 hour.

During stages 1 and 4, a reverse current period is between 30 ms and 1,000 ms. During stage 1 and stage 4, a ratio between (1) reverse current and (2) either forward current or dead time is preferably between 5:1 and 20:1.

During stage 2, the average values of reverse current and forward current are preferably equal. During stage 2, a reverse current period is preferably between 30 ms and 1,000 ms.

During stage 3, a duration of the powerful pulses of reverse current is preferably between 180 ms and 1,000 ms, and a duration of the dead time is preferably between 1,000 and 5,000 ms. During stage 3, a ratio between (1) reverse current and (2) either forward current or dead time is preferably between 10:1 and 20:1.

The completion of battery maintenance 16 occurs if: (1) there is no increase compared to a previous cycle in a control discharge capacity of the battery, or (2) if a last control discharge output was between 95-100% of a nominal capacity of a rated capacity of the battery being serviced.

The method for battery maintenance preferably includes the step 18 of implementing temperature control of an electrolyte in the battery. This step 18 includes monitoring the battery and determining if a battery temperature exceeds values of 35-50° C. during maintenance, then reducing the charge current by 30-50% and extending a charging stage for the battery accordingly and proportionately. The step 18 also may include monitoring the battery and determining if a battery temperature exceeds values of 45-50° C. during maintenance, and then interrupting maintenance until the battery has cooled to a temperature of 25-35° C.

The method implements voltage control of the battery by checking a voltage across the battery as compared to a control group of battery cells, determining if a threshold value is being exceeded, and then terminating battery maintenance if the threshold value is in fact exceeded.

In one embodiment, the method comprises voltage control of the battery by checking a voltage across the battery as compared to a control group of battery cells, determining if a threshold value is being exceeded, and then reducing the charge current 19 by 20-50% and lengthening stage phase duration accordingly and proportionately.

The primary PPCS is a programmable high-speed system on a chip (SoC; 1). The PPCS system comprises: six timer-counters, a vector interrupt controller that supports at least three external interrupt inputs (Interrupt Input); an IO controller having at least twelve digital outputs (Digital Output); a 12-bit high-speed analog-digital converter (ADC) serving at least three analog inputs (ADC Input), and an asynchronous input-output serial port controller. In some embodiments, this controller comprises a Universal Synchronous/Asynchronous Receiver/Transmitter (USART).

The controller algorithm, implemented in SoC, enables formation of the alternating forward and reverse charge current pulses and formation of discharge current pulses. Furthermore, the algorithm provides independent regulation of the average values of these currents and high-speed protection of the thyristors of the rectifier and inverter from overcurrent. This algorithm, it's effects, and its benefits, are described in detail hereinbelow.

Synchronizing pulse generators 2 enable, in the PPCS, synchronization of the control signals by the thyristors of the rectifier (R) and inverter (I) via voltage in the power supply. Synchronization signals pass from the outputs of the synchronizing pulse generators 2 to the external interrupt inputs of the SoC 1, where during subroutine processing of these interrupts, the discharge synchronization of six timer-counters occurs, providing control of the phase-shifts of control pulses of the rectifier and inverter thyristors.

The thyristor control pulses of the rectifier from the SoC output pass to the thyristor pulse generators 4, which generate pulses with parameters sufficient for opening thyristors; in addition, the thyristor pulse generators 4 provide a galvanic isolation between input and output circuits. Similar inverter thyristor pulse generators 5 are installed in the control circuits of the inverter's thyristors.

The task of controlling the phase shift of control signals using thyristors is calculated using inputted and actual current values through the battery (AB). Inputted values of output current and other parameters for the required rectifier and inverter thyristor control mode pass to the PPCS from the PLC via serial communication, which is ensured by providing the SoC with USART, which has a network driver 3 (e.g., RS-485) installed on its outputs.

Signals from the current sensor (CS) and voltage sensors on the accumulator battery and accumulator control group pass to the PPCS inputs. In the PPCS, the signal from the current sensor is processed in the input amplifier 6, and voltage signals are processed in the differential amplifiers 7. Similar signals pass from the output of these amplifiers to the ADC SoC inputs, where the signals are digitized and averaged. The values obtained from this processing step are transmitted to the PLC, and an actual current value is used in the PPCS for controlling current through the battery (AB).

Figure 3:
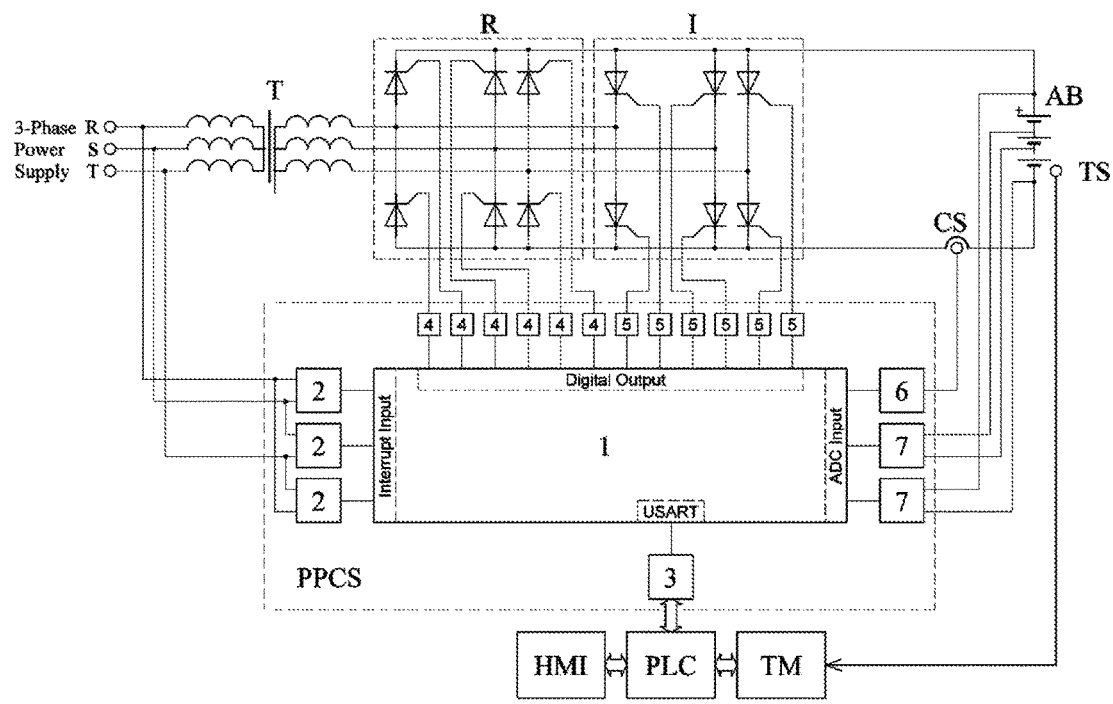
FIG. 3 shows a more detailed version of the functional diagram shown in FIG. 1.

FIG. 3 shows a more detailed diagram than that of FIG. 1. Namely, FIG. 3 shows the following elements: TS—Thermal Sensor; 1—system on a chip (SoC); 2—synchronization pulse generators; 3—network driver (e.g., RS-485); 4—thyristor control pulse generator for rectifier; 5—thyristor control pulse generator for inverter; 6—input amplifier; 7—differential input voltage amplifiers.

Figure 4:
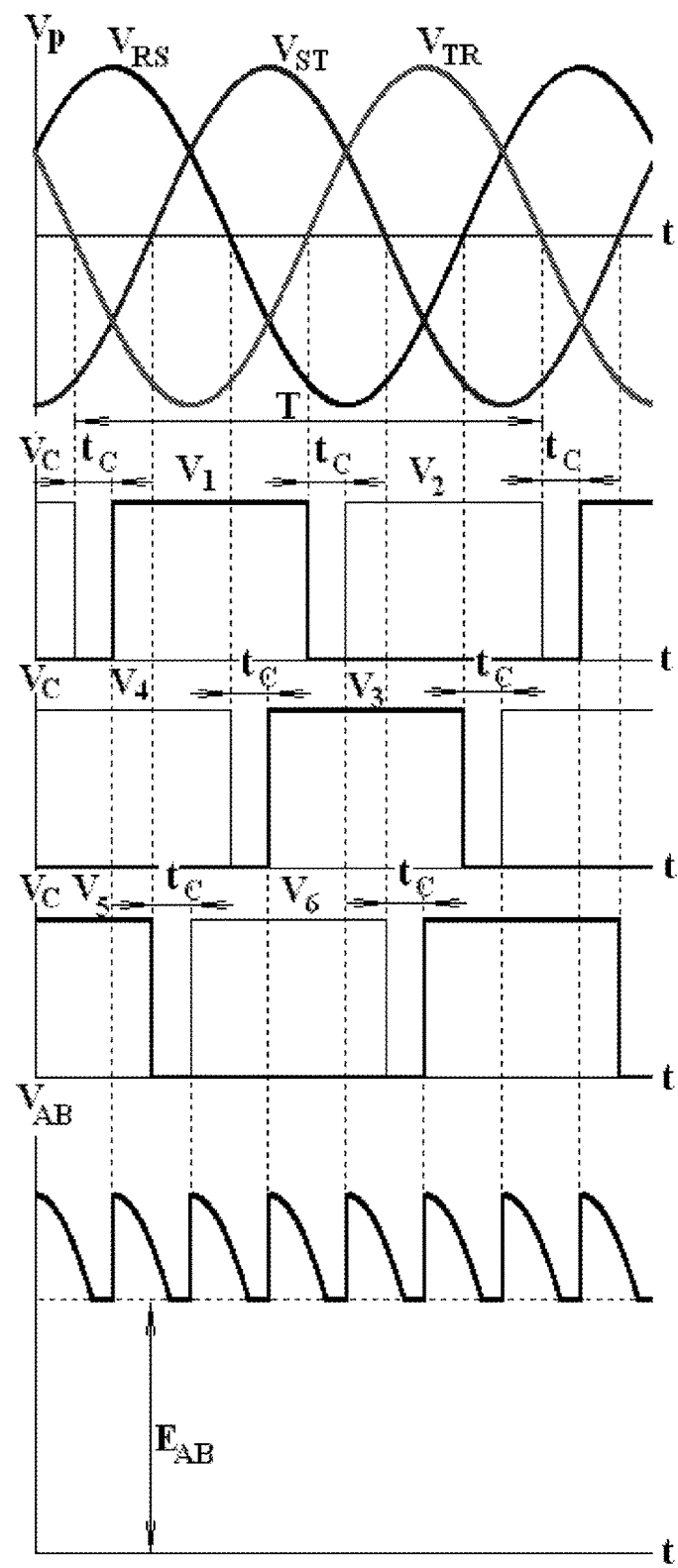
FIG. 4 shows an example of a formation of the output voltage pulses by the rectifier thyristors according to one embodiment of the present invention.
Figure 5:
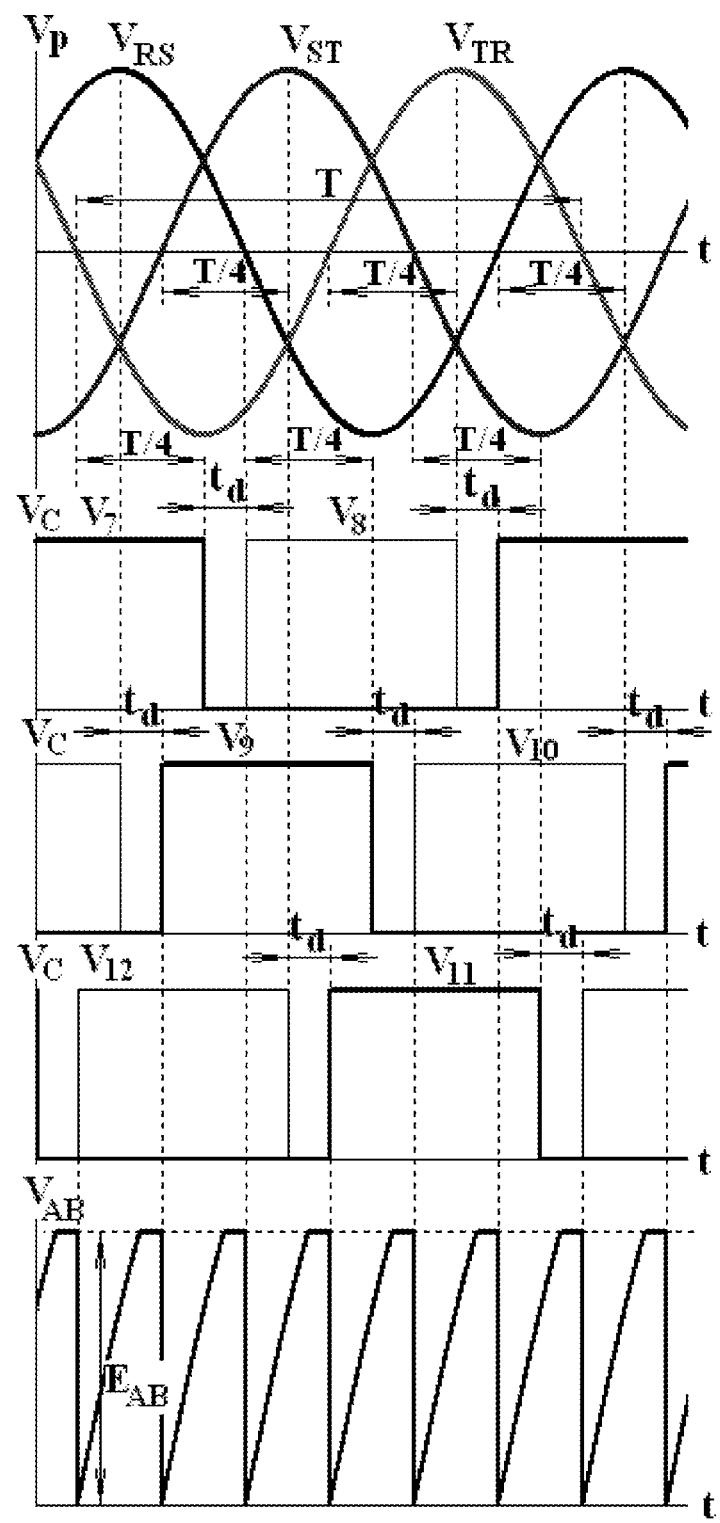
FIG. 5 shows an example of a formation of the output voltage pulses by the inverter thyristors according to one embodiment of the present invention.
Figure 6:
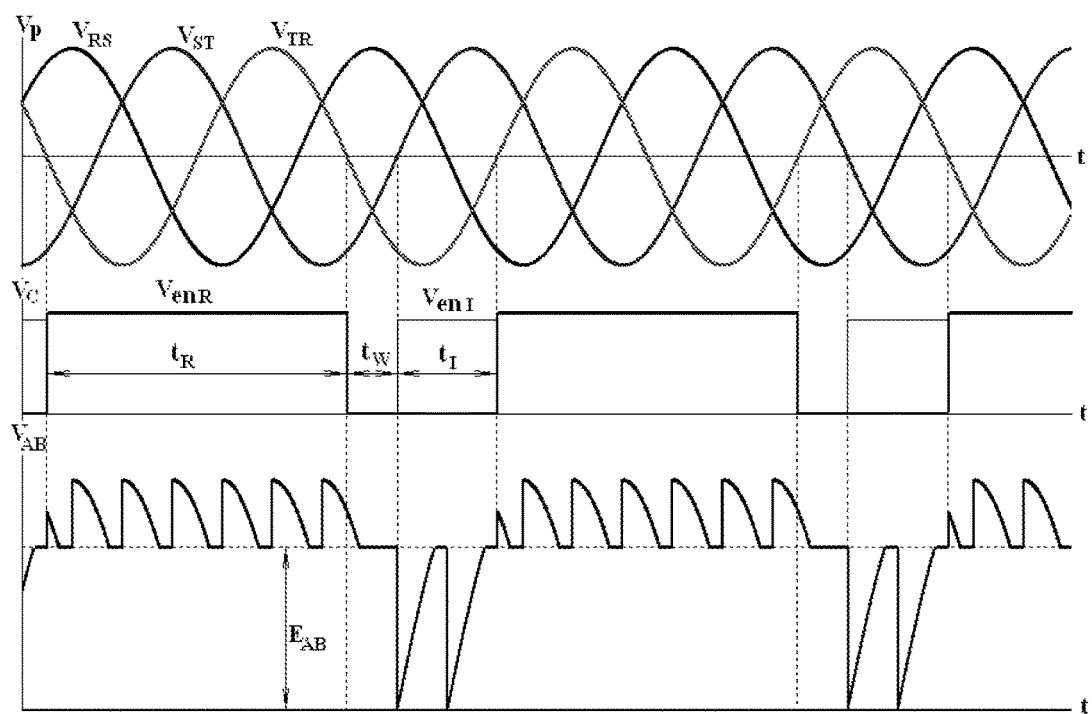
FIG. 6 shows an example of a formation of the combined output voltage pulses of the forward-reverse current according to one embodiment of the present invention.

Regarding FIGS. 4-6, a rectifier and inverter thyristor control algorithm is implemented in PPCS, allowing to form pulses of a constant charge current (FIG. 4) or discharge current (FIG. 5), as well as their cyclic combinations—i.e., forward-reverse charge current, with a pause (FIG. 6).

In general, FIG. 4 explains the formation of the output pulses of voltage of the rectifier thyristors. FIG. 4 has the following designations: $V_P$—supply voltage; $V_{RS}$, $V_{ST}$, $V_{TR}$—linear voltage of the three-phase power supply; $V_C$—control voltage; $V_1$-$V_6$—control voltage related to rectifier thyristors (FIG. 1); $V_{AB}$, $E_{AB}$—voltage and efficiency of the battery; t—time; T—period of the supply voltage; $t_c$—delay of the control pulses for rectifier thyristors.

In general, FIG. 5 explains the formation of the output voltage pulse from the inverter thyristors. Figure has the following designations: $V_P$—supply voltage; $V_{RS}$, $V_{ST}$, $V_{TR}$—linear voltage of the three-phase power supply; $V_C$—control voltage; $V_7$-$V_{12}$—control voltage of the corresponding inverter thyristors (FIG. 1); $V_{AB}$, $E_{AB}$—voltage and efficiency of the battery; t—time; T—period of the supply voltage; $t_d$—delay of the control pulses for the inverter thyristor.

In general, FIG. 6 explains the formation of the output voltage of reverse current pulses. FIG. 4 has the following designations: $V_P$—supply voltage; $V_{RS}$, $V_{ST}$, $V_{TR}$—linear voltage of the three-phase power supply; $V_C$—control voltage; $V_{en\ R}$—priority of the pulses formation by the rectifier (FIG. 2). $V_{en\ I}$—priority of the pulses formation by the inverter (see FIG. 5). $V_{AB}$, $E_{AB}$—voltage and efficiency of the battery; t—time; $t_R$—interval for the pulse formation by the rectifier; $t_I$—interval for the pulse formation by the inverter.

To control the rectifier thyristor(s) in the SoC, three timer-counters are used, the synchronization (i.e., reset) of which is performed using a transition from negative to positive values (front transitions) of sinusoidal inter-phase (linear) voltages of the supply (top of FIG. 4). The timer-counter that controls $V_1$ and $V_2$ thyristors is synchronized by $V_{TR}$ voltage; the timer-counter that controls $V_3$ and $V_4$ thyristors is synchronized by $V_{RS}$; and the timer-counter that controls $V_5$ and $V_6$ thyristors is synchronized by $V_{ST}$. Such is shown via the dashed lines corresponding to each labeled thyristor signal (FIG. 4).

One of the timer counters described herein also serves for measuring, T, the voltage period in the power supply network. Taking this measurement several times and over time, this particular timer stores value accumulated, and averaging said values based on a larger number of samples. The resulting average value is the voltage period, T, in the power supply network. For a desired value of the phase shift of the thyristor control signal on the SoC, the delay on the $t_C$ thyristors turning-on may be calculated, as well as the time moments, in order to enable or disable the thyristors based on the timer-counters. When these calculated values coincide with the values accumulated in the timer-counters, the desired level of the thyristor control signal $V_C$ is achieved (FIG. 4), and the sequence of voltage pulses $V_{AB}$ outputs from the device and is sent to the battery.

The remaining three timer-counters are used to control the inverter thyristors. They are synchronized at moments of inter-phase voltage peaks in the supply network. The moments of maxima (FIG. 5) of inter-phase voltage are detained by the interval, T/4, relative to the moments of frontal transitions of the inter-phase voltage. For example, a timer-counter may be programmed to measure a period of T/4 after a frontal transition of an interphase voltage coupled to that timer-counter; therefore, at the end of the period of T/4, which is initiated by the frontal transition, the timer-counter may cause the thyristor to switch (i.e., the switch occurs at the moment of maxima of that particular interphase voltage, via the algorithm). The timer-counter that controls thyristors $V_7$ and $V_8$ is synchronized with the voltage $V_{TR}$, the timer-counter that controls thyristors $V_9$ and $V_{10}$ is synchronized with the voltage $V_{TR}$, and the timer-counter that controls thyristors $V_{11}$ and $V_{12}$ is synchronized with the voltage $V_{ST}$. The control of the inverter thyristors is similar to the control of rectifier thyristors.

The formation of pulses of forward-reverse currents as the combined output of the device (FIG. 6) is carried out by sequential operation of the thyristors of the rectifier and the inverter. Pulses that control the rectifier thyristors are formed only at a high level of the $V_{enR}$ signal, and pulses that control the inverter thyristors are formed only at a high level of the $V_{enI}$ signal. The rectifier operation starts when one of the inter-phase voltages crosses zero. The duration of this interval, $t_R$, is always a multiple of the period of the voltage in the supply network. After ending of the interval, $t_R$, the inverter operation interval, $t_I$, starts after the next transition through zero of one of the inter-phase voltages. This solution allows for creating a minimally adequate $t_W$ pause to close all the thyristors of the rectifier. The $t_I$ interval ends only after the next zero crossing of the inter-phase voltage. Then, the rectifier operation interval begins and thus the formation of the cycle of the forward-reverse current pulses are repeated.

Thus, the present invention allows for creating forward-reverse current pulses with a repetition period starting from one and a half periods of voltage in the supply network.

A 4-stage battery charging mode, in contrast to existing charging modes, allows for a second stage wherein an alignment of battery characteristics occurs. The characteristics of the battery are aligned by using an alternating current with a charge equal to the average pulse forward and reverse currents. It should be noted that the proposed alignment procedure is carried out without additional charge devices and does not require monitoring of the state of the battery or batteries.

In order to form a reverse charge current and discharge current pulses, the invention uses a thyristor inverter driven network that allows to recover the electrical energy delivered by the battery in the power supply network. Due to this, the device does not contain elements which may scatter this energy, such as, e.g., power resistors.

Combining the functions of thyristor rectifier and inverter control, digitizing the instantaneous values of current through the battery, and calculating instantaneous values and/or the mean values of the forward and reverse charge and discharge currents, regulation and stabilization of the current in a single system on a single SoC chip is achieved. It is possible to increase the speed of the thyristor control system and its reliability, and improve the parameters of the current regulation. A narrow pulse after a failure is the result of a side effect of an arrival of the front of the rectification signal of the rectifier $V_{enR}$ (FIG. 4). This occurs at the moment of fulfilling the conditions for unlocking the rectifier thyristors, $V_4$ and $V_5$ (FIG. 2). The presently disclosed systems and devices allows, through the operation of the algorithm, for the generation of reverse pulses with a period of 25-30 ms after a forward pulse.

The method for battery maintenance further implementing voltage control of the battery by checking a voltage across the battery and a control group of battery cells and determining if a threshold value is being exceeded then terminating battery maintenance.

The method for battery maintenance further implementing voltage control of the battery by checking a voltage across the battery and a control group of battery cells and determining if a threshold value is being exceeded then reducing charge current by 20-50% and lengthening stage phase duration accordingly.

The method of battery maintenance, wherein a reverse current period is between 30-1000 ms in duration. The method of battery maintenance, wherein during stage 2 the average values of reverse current and forward current are equal. The method of battery maintenance, wherein during stage 2 wherein a reverse current period is between 30-1000 ms in duration. The method for battery maintenance, wherein during stage 3 a duration of the powerful pulses of reverse current is between 180-1000 ms and a duration of the dead time is between 1000-5000 ms. The method for battery maintenance, wherein during stage 3 a ratio between reverse current and either forward current or dead time is between 10:1-20:1. The method for battery maintenance, further implementing a temperature control of an electrolyte in the battery, comprising: (1) monitoring the battery and determining if a battery temperature exceeds values of 35-50° C. during maintenance then reducing charge current by 30-50% and extending a charging stage for the battery accordingly; and (2) monitoring the battery and determining if a battery temperature exceeds values of 45-50° C. during maintenance then interrupting maintenance until the battery has cooled to a temperature of 25-35° C.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A device for battery charging and maintenance, comprising:
    a terminal for an accumulator battery;
    the terminal having a positive side connected to a current sensor;
    the terminal having a negative side connected to a ground;
    the current sensor is electronically connected to a rectifier, said rectifier comprising at least three rectifier thyristors, and an inverter, said inverter comprising at least three inverter thyristors;
    the rectifier and the inverter are connected to a transformer;
    the transformer is connected to a power supply; and
    the terminal, the accumulator battery, the inverter, the rectifier, and the current sensor are together electronically connected to a phase-pulse control system, thus forming a power supply network, said phase-pulse control system being configured to cause the power supply network to perform at least one stage, said stage comprising:
    forming a first pulse, said first pulse being formed by the rectifier, said first pulse being synchronized via a front transition of a sinusoidal inter-phase voltage signal, wherein a first timer-counter controlling a first set of rectifier thyristors is synchronized by a first inter-phase voltage, wherein a second timer-counter controlling a second set of rectifier thyristors is synchronized by a second inter-phase voltage, wherein a third timer-counter controlling a third set of rectifier thyristors is synchronized by a third inter-phase voltage,
    measuring a total period (T) in the power supply network, said measuring being performed by one of said timer-counters,
    causing a pause, said pause being caused by an end of an interval prior to a consecutive front transition, said pause further causing a closure of all rectifier thyristors,
    forming a second pulse, said second pulse being formed by the inverter, said second pulse being synchronized at moments of inter-phase voltage peaks in the power supply network, said inter-phase voltage peaks being determined by adding an interval of T/4 to a given moment of a front transition of an inter-phase voltage, wherein a fourth timer-counter controlling a first set of inverter thyristors is synchronized by the first inter-phase voltage, wherein a fifth timer-counter controlling a second set of inverter thyristors is synchronized by the second inter-phase voltage, wherein a sixth timer-counter controlling a third set of inverter thyristors is synchronized by the third inter-phase voltage; and
    repeating said first pulse, said pause, and said second pulse.

2. The device of claim 1, wherein the pause is 25-30 ms.

3. The device of claim 1, wherein the pause is 30-70 ms.

4. The device of claim 1, wherein T is measured at least twice by said timer-counter and an average value of T is determined via a processor coupled to said timer-counter.

5. The device of claim 1, wherein the phase-pulse control system is in further electronic communication with a programmable logic controller.

6. The device for battery maintenance of claim 5, wherein the programmable logic controller is further electronically connected to a human machine interface and to a thermal monitor.

7. The device for battery maintenance of claim 6, wherein the thermal monitor is further connected to a thermal sensor, said thermal sensor being in contact with the accumulator battery.

8. A method for battery maintenance, comprising:
    connecting a battery to a power supply network,
    performing at least one stage of charging, said at least one stage of charging comprising:
    forming a first pulse, said first pulse being formed by a rectifier, said rectifier comprising at least three rectifier thyristors, said first pulse being synchronized via a front transition of a sinusoidal inter-phase voltage signal, wherein a first timer-counter controlling a first set of rectifier thyristors is synchronized by a first inter-phase voltage, wherein a second timer-counter controlling a second set of rectifier thyristors is synchronized by a second inter-phase voltage, wherein a third timer-counter controlling a third set of rectifier thyristors is synchronized by a third inter-phase voltage, measuring a total period (T) in the power supply network, said measuring being performed by one of said timer-counters, forming a second pulse, said second pulse being formed by an inverter, said inverter comprising at least three inverter thyristors, said second pulse being synchronized at moments of inter-phase voltage peaks in the power supply network, said inter-phase voltage peaks being determined by adding an interval of T/4 to a given moment of a front transition of an inter-phase voltage, wherein a fourth timer-counter controlling a first set of inverter thyristors is synchronized by the first inter-phase voltage, wherein a fifth timer-counter controlling a second set of inverter thyristors is synchronized by the second inter-phase voltage, wherein a sixth timer-counter controlling a third set of inverter thyristors is synchronized by the third inter-phase voltage;

wherein a pause occurs between said first pulse and said second pulse, said pause being caused by an end of an interval prior to a consecutive front transition, said pause further causing a closure of all rectifier thyristors, thus forming a first pulse-pause-second pulse signal for one or more stages of battery maintenance, and repeating said first pulse, said pause, and said second pulse.

9. The method of claim 8, comprising using only a pre-charge reverse current in a first stage.

10. The method of claim 9, further comprising a second stage of maintenance, said second stage employing a leveling reverse current for stabilizing an internal resistance of the battery.

11. The method of claim 10, further comprising a third stage of maintenance, said third stage employing pulses of reverse current and following said pulses of reverse current with a dead time.

12. The method of claim 11, further comprising a fourth stage of maintenance, said fourth stage charging the battery using a reverse current.

13. The method of claim 12, wherein the third stage and the fourth stage are repeated at least once.

14. The method of claim 10, wherein the second stage lasts 0.5 to 1 hour.

15. The method of claim 12, wherein a reverse current period is between 30-1000 ms in duration.

16. The method of claim 12, wherein during the second stage average values of reverse current and forward current are equal.

17. The method of claim 12, wherein during the second stage wherein a reverse current period is between 30-1000 ms in duration.

18. The method of claim 12, wherein during the third stage a duration of powerful pulses of reverse current is between 180-1000 ms and a duration of the dead time is between 1000-5000 ms.

19. The method of claim 12, wherein during said third stage a ratio between reverse current and either forward current or dead time is between 10:1-20:1.

20. The method for battery maintenance of claim 1, further implementing a temperature control of an electrolyte in the battery, comprising:

a. monitoring the battery and determining if a battery temperature exceeds values of 35-50° C. during maintenance then reducing charge current by 30-50% and extending a charging stage for the battery accordingly; and b. monitoring the battery and determining if a battery temperature exceeds values of 45-50° C. during maintenance then interrupting maintenance until the battery has cooled to a temperature of 25-35° C.

* * * * *